United States Patent
Kohlmann et al.

(10) Patent No.: US 10,507,725 B2
(45) Date of Patent: Dec. 17, 2019

(54) FILLER NECK HOUSING ARRANGEMENT

(71) Applicant: ILLINOIS TOOL WORKS INC., Glenview, IL (US)

(72) Inventors: Uwe Kohlmann, Wurzburg (DE); Sven Cronau, Schwarzach (DE); Gunter Hins, Wurzburg (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 3 days.

(21) Appl. No.: 15/919,813

(22) Filed: Mar. 13, 2018

(65) Prior Publication Data
US 2018/0264938 A1 Sep. 20, 2018

(30) Foreign Application Priority Data
Mar. 16, 2017 (DE) .................. 10 2017 105 616

(51) Int. Cl.
*B60K 15/04* (2006.01)
*B60K 15/03* (2006.01)
*B60K 15/05* (2006.01)

(52) U.S. Cl.
CPC .... *B60K 15/04* (2013.01); *B60K 2015/03453* (2013.01); *B60K 2015/048* (2013.01); *B60K 2015/0474* (2013.01); *B60K 2015/0553* (2013.01)

(58) Field of Classification Search
CPC .... B60K 2015/0553; B60K 2015/0474; B60K 2015/0458; B60K 2015/0477; B60K 2015/03467; B60K 2015/03453; B60K 2015/048; B60K 2015/03447; B60K 15/04; B60K 15/05

USPC ................................. 220/86.1, 86.2
See application file for complete search history.

(56) References Cited

U.S. PATENT DOCUMENTS

| 4,252,245 | A | * | 2/1981 | Kudo | ............ F16L 41/086 |
| | | | | | 220/86.2 |
| 5,253,773 | A | * | 10/1993 | Choma | ............ B21D 39/06 |
| | | | | | 220/86.2 |
| 6,446,826 | B1 | | 9/2002 | Foltz | |
| 8,430,140 | B2 | | 4/2013 | Ognjanovski | |
| 8,684,443 | B2 | | 4/2014 | Hara | |
| 8,770,648 | B2 | | 7/2014 | Eberle | |

(Continued)

FOREIGN PATENT DOCUMENTS

| DE | 10 2011004556 A1 | 10/2008 |
| DE | 10 2008 01768 A1 | 10/2009 |
| JP | 2008247368 A | 10/2008 |

*Primary Examiner* — Mollie Impink
(74) *Attorney, Agent, or Firm* — Thompson Hine LLP

(57) ABSTRACT

A filler neck housing arrangement for mounting on a body opening of a motor vehicle includes a housing body (12) which forms a passage opening for the insertion of at least one tank filler pipe. An annular sealing and holding body (10) is configured for holding the sealing and holding body on the body opening and for holding the sealing and holding body on the housing body. The sealing and holding body includes a first sealing member which, in the state of the sealing and holding body being held on the body opening, lies in a sealing manner against a surface (30) of a body part (28) bounding the body opening, and a second sealing member which, in the state of the sealing and holding body being held on the housing body, lies in a sealing manner against the housing body (12).

16 Claims, 3 Drawing Sheets

(56) References Cited

U.S. PATENT DOCUMENTS

| | | |
|---|---|---|
| 8,794,467 B2 | 8/2014 | Zentner |
| 8,905,458 B2 | 12/2014 | Pipp |
| 9,688,136 B2 | 6/2017 | Roth |
| 2013/0206757 A1* | 8/2013 | Nagai ................ B60K 15/0406 220/86.2 |
| 2014/0084550 A1* | 3/2014 | Ogata ..................... F16J 15/02 277/626 |
| 2015/0191080 A1 | 7/2015 | Beck |
| 2015/0274010 A1 | 10/2015 | Roth |
| 2017/0057346 A1 | 3/2017 | Herzig |

* cited by examiner

FILLER NECK HOUSING ARRANGEMENT

TECHNICAL FIELD

The invention relates to a filler neck housing arrangement for mounting on a body opening of a motor vehicle, comprising a housing body which forms a passage opening for the insertion of at least one tank filler pipe.

BACKGROUND

A motor vehicle can, for example, be a passenger vehicle or a truck. At least one vehicle tank can be filled with an operating fluid, for example fuel or a urea solution (Adblue), via the at least one tank filler pipe.

Filler neck housing arrangements have firstly to be held securely on the body opening. Secondly, the space between the housing body with the tank filler pipe and the body opening generally has to be sealed. The housing body here frequently has to be fastened between an inner body part provided with a body opening and an outer body part likewise provided with a body opening. Single-part filler neck housing arrangements are known, in which a soft component is molded onto the housing body. The soft component serves to be placed in a sealing manner onto the body opening of the inner body part and optionally onto the body opening of the outer body part. However, the mounting of such single-part filler neck housing arrangements is difficult since it is complicated to have to thread the soft component through the respective body openings and position same. Leakages may occur in the event of mounting errors. In addition, undesirably high mounting forces may occur. A different solution is a two-part filler neck housing arrangement with a carrier which firstly lies tightly against the body opening, in particular the inner body part, and secondly against the tank filler pipe. At the same time, the tank filler pipe has to lie tightly against a suitable holding section of the housing body. This is complicated in terms of production and mounting, inter alia since the tank filler pipe has to be passed through both seals. This is also true of a water outlet hose which may be provided. In addition, upon contact between fuel and the sealing material, the sealing material may swell and thereby cause losses in tightness. Furthermore, tightness problems may arise because of incorrect mounting or insufficient compensation for tolerances in relation to the position of the tank filler pipe. A third solution provides a separate component having an expanding foam for sealing purposes between the inner body part and the outer body part. However, said foam may sometimes escape in an uncontrolled manner and therefore soil regions which are provided as mounting surfaces for other components. In addition, this variant is associated with high costs in production.

The above problems are increased if the cross section of the body openings becomes larger, which is the case in particular when a second tank filler pipe, for example for a urea solution (Adblue) is provided or retrofitted, or if the body opening lies in a curved body part. Such enlarged opening cross sections require correspondingly enlarged seals, and the mounting, in particular the orientation especially of the single-part filler neck housing arrangements, is made more difficult. This is true not least because of the comparatively high tolerances in respect of the opening cross sections.

SUMMARY

Starting from the explained prior art, the invention is based on the object of providing a filler neck housing arrangement of the type mentioned at the beginning which can be mounted in a simple manner and always ensures reliable sealing even when body opening cross sections are enlarged.

The invention achieves the object by means of the subject matter of claim 1. Advantageous refinements are found in the dependent claims, the description and the figures.

The filler neck housing arrangement mentioned at the beginning is characterized according to the invention by an annular sealing and holding body which has first holding means for holding the sealing and holding body on the body opening and second holding means for holding the sealing and holding body on the housing body, wherein the first holding means are provided with first sealing means which, in the state of the first holding means in which the latter are held on the body opening, lie in a sealing manner against a surface of a body part bounding the body opening, and wherein the second holding means are provided with second sealing means which, in the state of the second holding means in which the latter are held on the housing body, lie in a sealing manner against the housing body.

The filler neck housing arrangement according to the invention is therefore in particular in two parts, comprising the housing body and the sealing and holding body. The sealing and holding body is annular and, as a separate intermediate piece, holds the housing body on the body part which forms the body opening and which is, for example, an inner body part. Where a ring shape is mentioned in this application, this comprises both circular ring shapes and also other ring shapes, for example oval rings or rectangular rings. For holding the housing body on the body opening, the sealing and holding body has first and second holding means. The sealing and holding body is held on the body opening by the first holding means. The second holding means hold the housing body on the sealing and holding body. At the same time, the sealing and holding body provides sealing firstly on the body opening and secondly on the housing body. For this purpose, first sealing means are provided which lie against the body opening, in particular against a surface of the body part bounding the body opening. Furthermore, second sealing means are provided which lie against the housing body. By means of this sealing between the body opening and the housing body, the space between the housing body and the body opening is reliably sealed against passage of in particular moisture or dirt. By the sealing taking place according to the invention in relation to the housing body and not, as in known two-part filler neck housing arrangements, in relation to the tank filler pipe, possible position tolerances of the at least one tank filler pipe no longer play any role in the tightness. At the same time, even body openings of a larger cross section can be reliably sealed by the first sealing means of the sealing and holding body in a simple-to-mount manner. The filler neck housing arrangement according to the invention is cost-effective in production. Reliable sealing is ensured even in relation to body parts which are curved in the region of the body openings. The positioning between the housing body and the body opening is reliably realized by means of the sealing and holding body according to the invention, inter alia since the sealing and holding body provides sufficient stability. With single-part filler neck housing arrangements, mounting in large body openings is not possible.

In the present application, for reasons of simplicity, basically a filler neck housing arrangement and at least one tank filler pipe are referred to. It goes without saying that the filler neck housing arrangement can in principle also be a charging housing arrangement, in which case the at least one tank filler pipe is then formed by at least one plug-in charging connector for producing an electrical connection between vehicle batteries and an electrical source.

According to one refinement, the first holding means can comprise a first holding ring made of plastic with first latching means for latching on the body opening. The first sealing means can comprise an annular first sealing lip which is made of plastic and is integrally formed on the first holding ring, wherein the first sealing lip is composed of a softer plastic than the first holding ring. The first sealing lip in particular forms an elastic sealing ring. The latter is placed in the mounted state, with a slight deviation from its inoperative shape, in a sealing manner against the body part bounding the body opening. The first holding ring can be composed in particular of a hard component, and therefore said holding ring is substantially inelastic. This facilitates the mounting and protects the sealing function further.

According to a further refinement, the first latching means can have a plurality of latching hooks, wherein, in the state held on the body opening, the latching hooks lie on an upper side, which faces the housing body, of the body part bounding the body opening, and the first sealing lip lies on the lower side, which faces away from the housing body, of the body part bounding the body opening. It is possible here to surround the latching hooks with a plastics material which is softer than the latching hooks in order firstly to ensure sealing and secondly to permit the mounting of the latching hooks in a simple manner. Said softer plastics material can be composed of the same material as the first and/or second sealing lip. In particular, said softer plastics material can be connected integrally to the first and/or second sealing lip, for example by a two-component injection-molding-process step.

According to a further refinement, the second holding means can comprise a second holding ring made of plastic with second latching means for latching to the housing body, and the second sealing means can comprise an annular second sealing lip which is made of plastic and is integrally formed on the second holding ring, wherein the second sealing lip is composed of a softer plastic than the second holding ring. The second sealing lip in turn forms an elastic sealing ring. In the mounted state, said sealing ring is placed, with a slight deflection from its inoperative shape, in a sealing manner against the housing body. The second sealing lip is preferably placed against the outer side of the housing body. However, it is also possible for the second sealing lip to be placed against the inner side of the housing body. The housing body can be designed, for example, in the shape of a cup. The cup shape then forms the passage opening for the insertion of the at least one tank filler pipe. The second sealing lip can lie against the outer side of a housing body wall forming the cup shape. The second holding ring can in turn be composed of a hard component, and therefore it is substantially inelastic.

Latching means corresponding to the second latching means of the second holding ring can be provided on the housing body. The latching means of the housing body can be formed in particular on an outer side of the housing body. The second latching means of the second holding ring can be, for example, latching cutouts in which corresponding latching projections of the housing body then engage. Of course, in this respect, a reversed configuration of the latching projections and latching cutouts is also possible.

According to a further refinement, the first holding ring and the second holding ring can be connected to each other by a compensating ring which is composed of plastic and is integrally formed on the first holding ring on one side and on the second holding ring on the other side, wherein the compensating ring is composed of a softer plastic than the first holding ring and the second holding ring. The compensating ring is elastic and thus permits a relative movement between the first and second holding ring. As a result, compensation of tolerances in respect of possible position or cross-sectional tolerances of the body opening or of the housing body is made possible in a simple manner.

The compensating ring can be composed of the same material as the second sealing lip. Furthermore, the compensating ring can be connected integrally to the second sealing lip. The first sealing lip and the second sealing lip can also be composed of the same material. Similarly, the first holding ring and the second holding ring can be composed of the same material. It is therefore possible for the sealing and holding body to be composed overall of only two different materials.

According to a further refinement, a holding portion which, in the mounted state, lies against the at least one tank filler pipe and, for example, is composed of plastic, can be arranged in the passage opening of the housing body. The holding portion can be composed of a softer material than the housing body. Said holding portion can lie in a sealing manner against the at least one tank filler pipe. However, this is not required. The holding portion can therefore in particular also lie in a non-sealing manner against the at least one tank filler pipe. According to the invention, a seal is not required here since there is already secure sealing against the housing body by means of the sealing and holding body. The housing body can likewise be composed of plastic. The holding portion can then in particular be integrally formed on the housing body. In particular, the holding portion can be injection-molded onto the housing body in a two-component injection-molding process. The holding portion can have elasticity in order to simplify the mounting and to provide a certain compensation for tolerances in relation to the position of the at least one tank filler pipe.

The holding portion can also have two openings which are provided to lie against a respective tank filler pipe. A first tank filler pipe can be provided for refueling with a fuel. A second tank filler pipe can be provided for refueling with a urea solution for reducing nitrogen oxide (Adblue).

As already mentioned, the body part forming the body opening can be an inner body part of the motor vehicle. The housing body can then furthermore have third holding means with which the housing body can be held on a further body opening, wherein the further body opening is formed by an outer body part of the motor vehicle. The sealing and holding body is then held by its first holding means on the body opening of the inner body part. The housing body is held by its (third) holding means on the further body opening of the outer body part. The inner and outer body parts can be in particular an inner panel or outer panel of the body of the motor vehicle. An intermediate space is formed between the inner and the outer body parts. The third holding means can also have a sealing function, and therefore the housing body lies tightly against the further body opening. The space between the two body openings is then reliably sealed. However, such a further sealing function is not compulsory.

The sealing and holding body can be produced in a particularly simple manner in terms of production in a two-component injection-molding process. The housing body, optionally together with the holding portion thereof, can also be produced in a (two-component) plastics injection-molding process.

According to a further refinement, mounting markings can be provided on the sealing and holding body, which indicate to a fitter where the sealing and holding body should be pressed against the housing body for mounting purposes. This facilitates the mounting and avoids mounting errors and therefore possibly associated tightness problems.

The invention also relates to a filler neck housing arrangement according to the invention in the state mounted on the body opening. This optionally relates to the state fastened to the two body openings of inner body part and outer body part.

In addition, the invention also relates to a system consisting of a filler neck housing arrangement and inner and outer body parts which form the body opening and the further body opening.

BRIEF DESCRIPTION OF THE DRAWINGS

An exemplary embodiment of the invention is explained in more detail below with reference to figures, in which, schematically.

Unless stated otherwise, the same reference signs denote the same objects in the figures.

DETAILED DESCRIPTION

Figure 1:
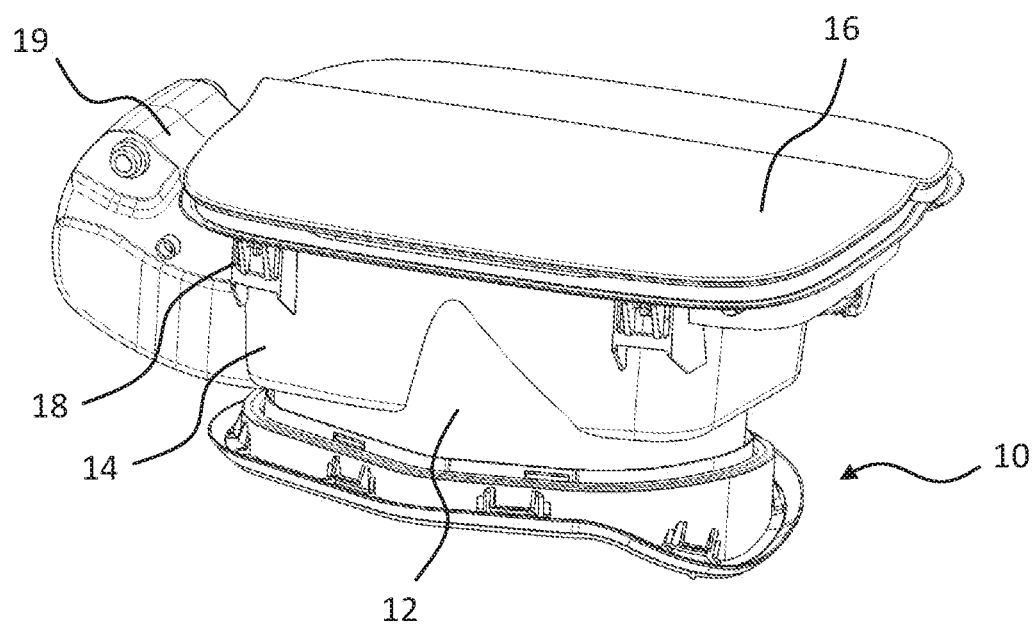
FIG. 1 shows a filler neck housing arrangement according to the invention with a tank flap fastened thereto, in a perspective view.

In FIG. 1, an annular sealing and holding body, on which a housing body 12 of the filler neck housing arrangement is held, is shown at the reference sign 10. A flap housing 14 is in turn held on the housing body 12, with a tank flap 16 which can be pivoted in a manner known per se via a pivot arm 19 between the closed position, shown in FIG. 1, and a pivoted-up open position. The annular sealing and holding body 10 is held in a manner explained in more detail below on a body opening of a body part (not illustrated in FIG. 1), in particular on an inner body part. In addition, in the example shown, the housing body 12 is held on a further body opening of an outer body part (likewise not illustrated specifically in FIG. 1) via the flap housing 14. For this purpose, the flap housing 14 has a plurality of latching projections 18. In a manner likewise known per se, the housing body 12 forms a passage opening for the insertion of at least one tank filler pipe. For this purpose, in the example shown, in the passage opening of the housing body, a holding portion, which lies against the at least one tank filler pipe, is integrally formed on the housing body, as explained in more detail below.

Figure 2:
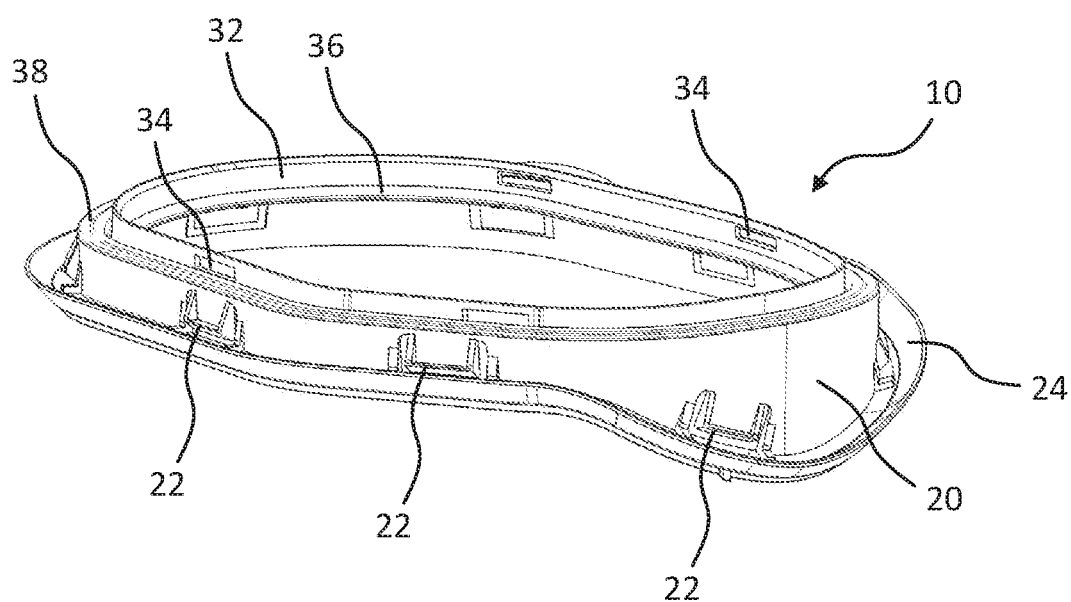
FIG. 2 shows the sealing and holding body of the filler neck housing arrangement shown in FIG. 1, in a perspective view.
Figure 3:
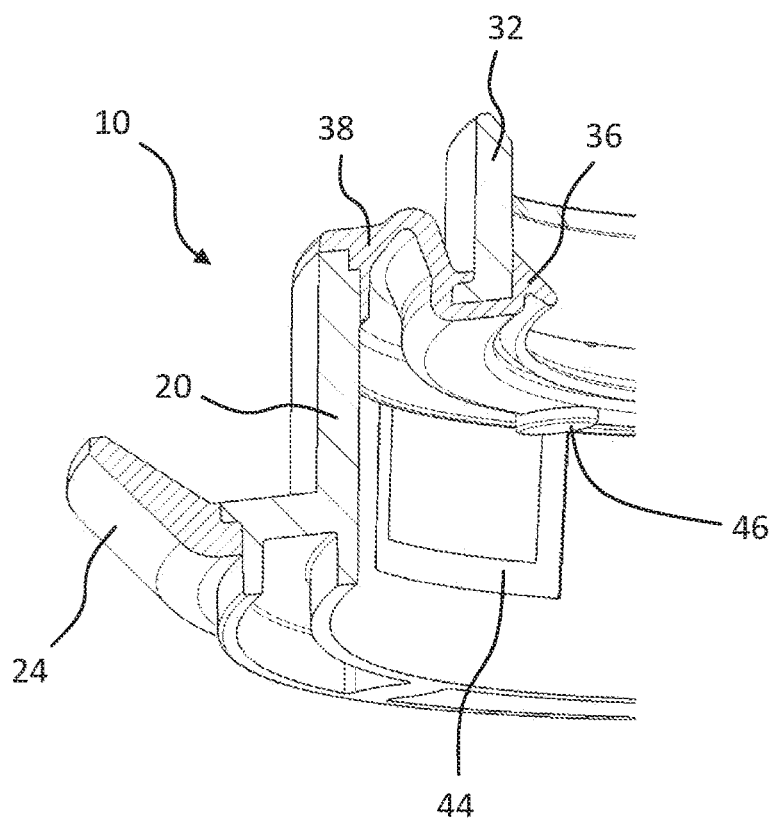
FIG. 3 shows a perspective sectional view through the sealing and holding body shown in FIG. 2.
Figure 4:
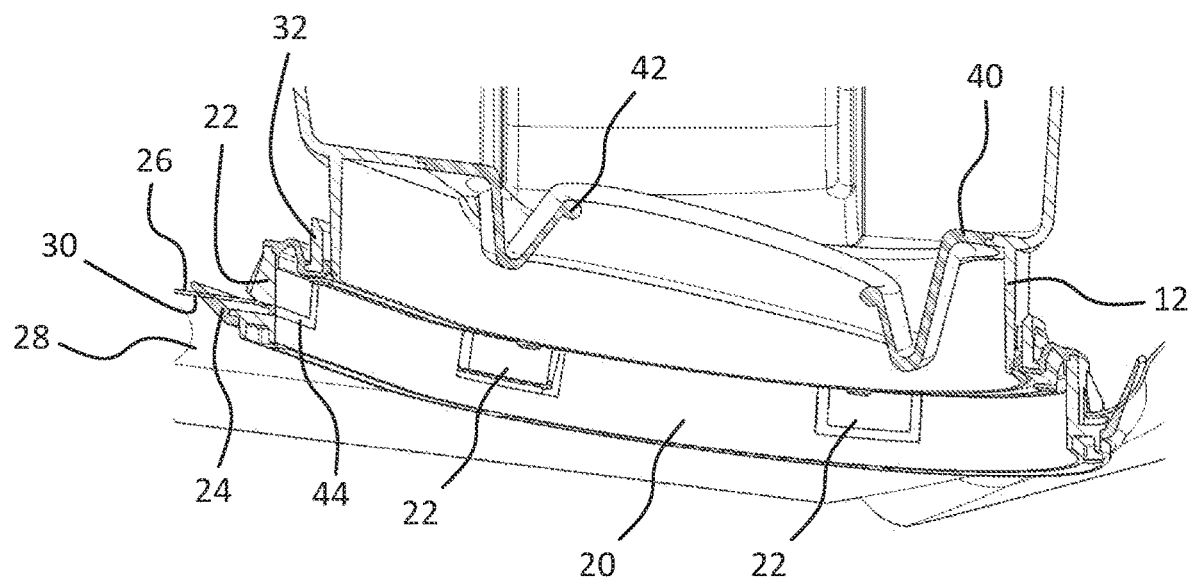
FIG. 4 shows a perspective sectional view through the sealing and holding body shown in FIG. 2, in the state fastened to a body opening of a body part and with the housing body of the filler neck housing arrangement held on the sealing and holding body.
Figure 5:
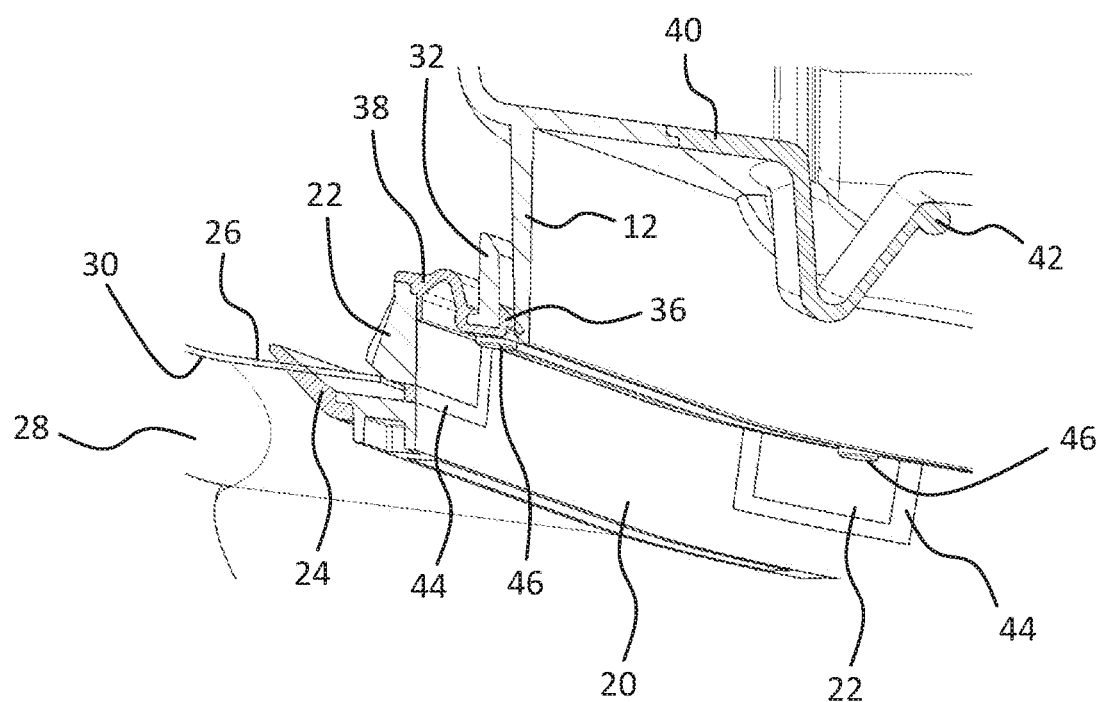
FIG. 5 shows an enlarged detailed view of the illustration from FIG. 4.
Figure 6:
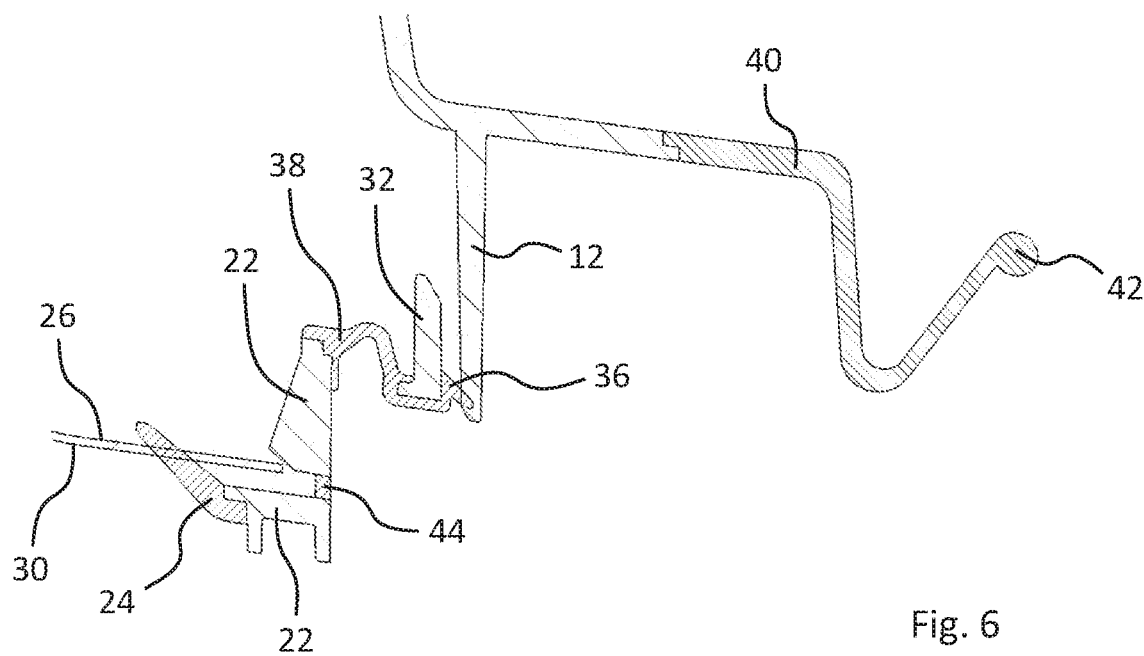
FIG. 6 shows a further enlarged sectional view of the illustration from FIG. 4.

FIG. 2 illustrates the annular sealing and holding body 10 of the filler neck housing arrangement according to the invention. The sealing and holding body 10 comprises a first holding ring 20 made of plastic with a plurality of latching hooks 22. The latching hooks 22 are arranged distributed approximately uniformly over the circumference of the holding ring 20. An annular first sealing lip 24 which is composed of a softer plastic than the first holding ring 20 is integrally formed on the first holding ring 20. The first sealing lip 24 is elastic and is curved upward in the starting state shown in FIG. 2. For holding on the body opening, the sealing and holding body 10 is inserted into the body opening, wherein the latching hooks 22 first of all, by deformation inward, move past the edge of the body opening and subsequently, with deformation back outward, lie in a latching manner against the upper side 26 of the inner body part 28 bounding the body opening (see FIGS. 4 to 6). From the opposite lower side 30 of the body part 28, the first sealing lip 24 is placed against the body part, as can be seen in turn in FIGS. 4 to 6, wherein, for illustrative reasons, the first sealing lip 24 is illustrated above the body part. The first elastic sealing lip 24 is actually slightly deformed in relation to its inoperative shape when lying against the lower side 30.

Furthermore, the sealing and holding body 10 has a second holding ring 32 composed of the same plastic as the first holding ring 20, wherein the second holding ring 32 is provided with latching cutouts 34 for latching against corresponding latching projections of the housing body 12. An annular second sealing lip 36 is integrally formed on the second holding ring 32. The second sealing lip 36 is composed of the same softer plastic as the first sealing lip 24 and is likewise elastic. In the state mounted on the housing body 12, said sealing lip is placed, with a slight deformation from its inoperative position, in a sealing manner against the outer side of the housing body 12, as can be seen in turn in particular in FIGS. 4 to 6. Again, the second sealing lip 36 is illustrated above the cup-shaped wall of the housing body 12 in FIGS. 4 to 6 for graphical reasons.

Furthermore, the first holding ring 20 and the second holding ring 32 are connected to each other via a compensating ring 38 made of an elastically softer plastic. In the example shown, the second sealing lip 36 and the compensating ring 38 are connected integrally to each other and are composed of the same material. The sealing and holding body 10 is composed overall only of two different plastics materials and can therefore be produced in a simple manner in a two-component injection-molding process.

Furthermore, in the passage opening formed by the cup-shaped housing body 12, a holding portion 40 composed of a flexible plastic which is softer than the housing body 12 is integrally formed on the housing body 12, for example in a two-component injection-molding process. The holding portion 40 forms an annular receptacle 42 for a tank filler pipe to be inserted in the passage opening. The holding portion 40 can have a further annular receptacle for the insertion of a further tank filler pipe. It is therefore possible, for example, for a tank filler pipe to be provided for refueling the motor vehicle with fuel and for a second tank filler pipe to be provided for refueling the motor vehicle with a urea solution (Adblue).

In the example shown, the latching hooks 22 are each formed by cutouts in the wall of the first holding ring 20, wherein said cutouts are filled with the soft plastics material of the second sealing lip 36, as illustrated at reference sign 44 in the figures. In addition, mounting markings for a fitter can be seen at reference sign 46. Said mounting markings indicate the pressure points for the mounting of the sealing and holding body 10 on the housing body 12.

For the mounting of the filler neck housing arrangement according to the invention, the sealing and holding body 10 can first of all be inserted in a simple manner into the body opening formed by the inner body part, and therefore said sealing and holding body is held on said body opening as explained above. Subsequently, the housing body 12 can be inserted from above through the further body opening of the outer body part and held on the sealing and holding body 10 in the manner explained above. A reverse mounting sequence is also possible. The mounting is simplified and secure sealing is always ensured.

LIST OF REFERENCE SIGNS

10 sealing and holding body
12 housing body
14 flap housing
16 tank flap
18 latching projections
19 pivot arm
20 first holding ring
22 latching hook
24 first sealing lip
26 upper side of the inner body part
28 inner body part
30 lower side of the inner body part
32 second holding ring
34 latching cutout
36 second sealing lip
38 compensating ring
40 holding portion
42 annular receptacle
44 plastics material
46 mounting markings

The invention claimed is:

1. A filler neck housing arrangement for mounting on a body opening of a motor vehicle, comprising a housing body (12) which forms a passage opening for the insertion of at least one tank filler pipe, an annular sealing and holding body (10) which has first holding means for holding the sealing and holding body (10) on the body opening and second holding means for holding the sealing and holding body (10) on the housing body (12), wherein the first holding means are provided with first sealing means wherein, when the first holding means holds the sealing and holding body (10) on the body opening, the first sealing means lie in a sealing manner against a surface of a body part (28) bounding the body opening, and wherein the second holding means are provided with second sealing means wherein, when the second holding means holds the sealing and holding body (10) on the housing body (12), the second sealing means lie in a sealing manner against the housing body (12).

2. The filler neck housing arrangement as claimed in claim 1, wherein the first holding means comprise a first holding ring (20) made of plastic with first latching means for latching on the body opening, and the first sealing means comprise an annular first sealing lip (24) which is made of plastic and is integrally formed on the first holding ring (20), wherein the first sealing lip (24) is composed of a softer plastic than the first holding ring (20).

3. The filler neck housing arrangement as claimed in claim 2, wherein the first latching means have a plurality of latching hooks (22), wherein, when the first holding means holds the sealing and holding body (10) on the body opening, the latching hooks (22) lie on an upper side (26), which faces the housing body (12), of the body part (28) bounding the body opening, and the surface against which the first sealing lip (24) lies is located on a lower side (30), which faces away from the housing body (12), of the body part (28) bounding the body opening.

4. The filler neck housing arrangement as claimed in claim 2, wherein the second holding means comprise a second holding ring (32) made of plastic with second latching means for latching to the housing body (12), and the second sealing means comprise an annular second sealing lip (36) which is made of plastic and is integrally formed on the second holding ring (32), wherein the second sealing lip (36) is composed of a softer plastic than the second holding ring (32).

5. The filler neck housing arrangement as claimed in claim 4, characterized in that latching means corresponding to the second latching means of the second holding ring (32) are provided on the housing body (12).

6. The filler neck housing arrangement as claimed in claim 4, wherein the first holding ring (20) and the second holding ring (32) are connected to each other by a compensating ring (38) which is composed of plastic and is integrally formed on the first holding ring (20) on one side and on the second holding ring (32) on the other side, wherein the compensating ring (38) is composed of a softer plastic than the first holding ring (20) and the second holding ring (32).

7. The filler neck housing arrangement as claimed in claim 6, wherein the compensating ring (38) is composed of the same material as the second sealing lip (36).

8. The filler neck housing arrangement as claimed in claim 7, wherein the compensating ring (38) is connected integrally to the second sealing lip (36).

9. The filler neck housing arrangement according to claim 1, wherein, in the passage opening of the housing body (12), a holding portion (40) which, in a mounted state, lies against the at least one tank filler pipe is arranged on the housing body (12).

10. The filler neck housing arrangement as claimed in claim 9, wherein the holding portion (40) has two openings which are provided to lie against a respective tank filler pipe.

11. The filler neck housing arrangement according to claim 1, wherein the body part (28) forming the body opening is an inner body part (28) of the motor vehicle, and the housing body (12) has third holding means with which the housing body (12) can be held on a further body opening, wherein the further body opening is formed by an outer body part of the motor vehicle.

12. The filler neck housing arrangement according to claim 1, wherein the sealing and holding body (10) is produced in a two-component injection-molding process.

13. The filler neck housing arrangement according to claim 1, wherein the filler neck housing is mounted on the body opening.

14. A filler neck housing assembly for mounting on a body opening of a motor vehicle, the assembly comprising a housing body (12) which forms a passage opening for the insertion of at least one tank filler pipe, an annular sealing and holding body (10) which is configured for both holding the sealing and holding body (10) on the body opening and for holding the sealing and holding body (10) on the housing body (12), wherein the annular sealing and holding body (10) includes a first sealing member which, in a state of the sealing and holding body being held on the body opening, lies in a sealing manner against a surface of a body part (28) bounding the body opening, and wherein the annular sealing and holding body includes a second sealing member which, in a state of the sealing and holding body being held on the housing body (12), lies in a sealing manner against the housing body (12);

wherein the sealing and holding body includes a first holding ring (20) made of plastic with at least a first latch for latching on the body opening, and in that the first sealing member comprises an annular first sealing lip (24) which is made of plastic and is integrally formed on the first holding ring (20), wherein the first sealing lip (24) is composed of a softer plastic than the first holding ring (20).

15. The filler neck housing arrangement as claimed in claim 14, wherein the first latch comprises a plurality of latching hooks (22), wherein, in the state held on the body opening, the latching hooks (22) lie on an upper side (26), which faces the housing body (12), of the body part (28) bounding the body opening, and the surface against which the first sealing lip (24) lies is located on a lower side (30), which faces away from the housing body (12), of the body part (28) bounding the body opening.

16. The filler neck housing arrangement as claimed in claim 15, wherein the sealing and holding body includes a second holding ring (32) made of plastic with at least a second latch for latching to the housing body (12), and the second sealing member comprises an annular second sealing lip (36) which is made of plastic and is integrally formed on the second holding ring (32), wherein the second sealing lip (36) is composed of a softer plastic than the second holding ring (32).

* * * * *